Figure 1:
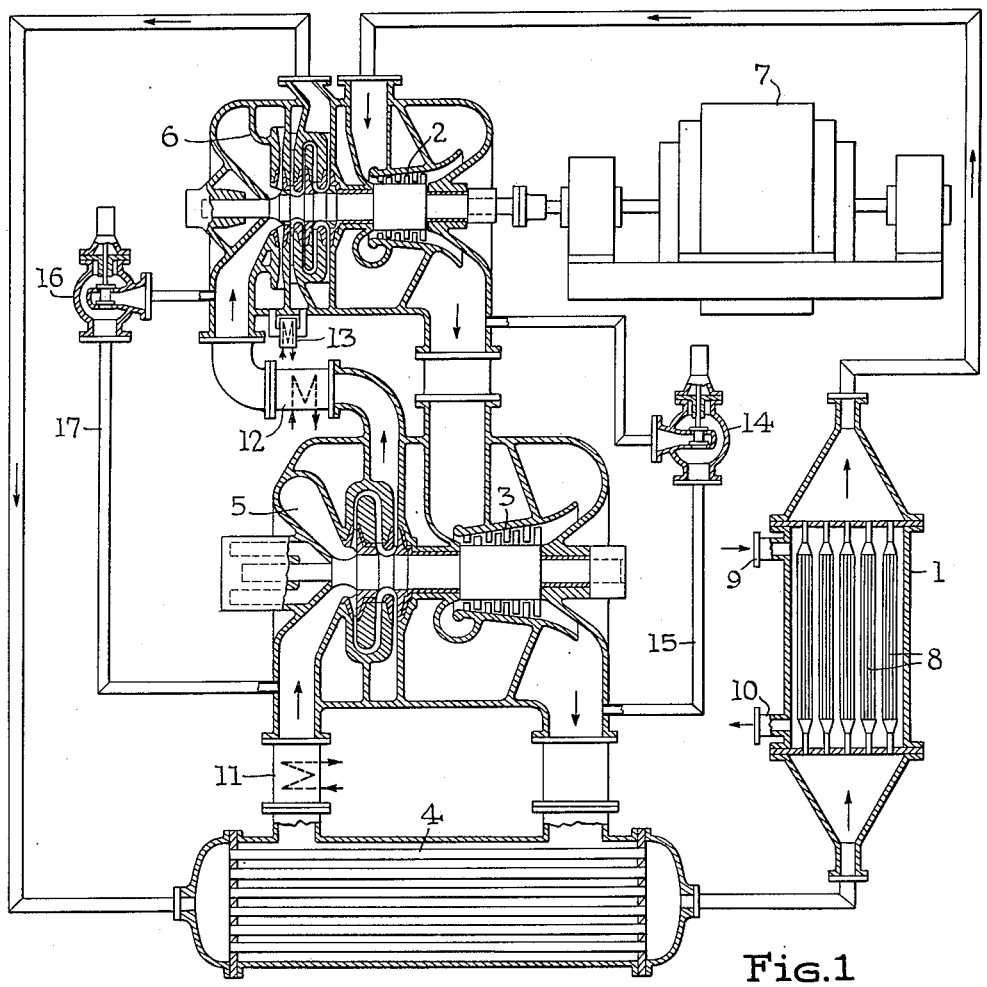

Jan. 29, 1957   D. SCHMIDT   2,779,159

THERMAL POWER INSTALLATION FOR UTILISING WASTE HEAT

Filed March 26, 1953

INVENTOR

David Schmidt

BY

ATTORNEYS

United States Patent Office 2,779,159
Patented Jan. 29, 1957

2,779,159

THERMAL POWER INSTALLATION FOR UTILISING WASTE HEAT

David Schmidt, Zurich, Switzerland, assignor to Aktiengesellschaft fuer Technische Studien, Zurich, Switzerland, a corporation of Switzerland Application March 26, 1953, Serial No. 344,769

Claims priority, application Switzerland May 1, 1952

7 Claims. (Cl. 60—59)

The invention relates to a thermal power installation in which a gaseous working medium, preferably air, describes a cycle for utilising heat being accumulated in a heat carrier.

In a thermal power installation of this type, the gaseous working medium is brought by a compressor to an increased pressure and is heated in a heater by supply of heat from outside, whereupon it is expanded again in a turbine substantially to the intake pressure of the compressor. The working medium leaving the turbine delivers the heat contained therein, as far as possible in a heat exchanger, to the compressed working medium before it enters the heater. The compressed working medium thus passes into the heater at a temperature which is practically as high as the temperature at which the expanded working medium leaves the turbine.

For example, if the heater is of the combustion type, the combustion gases can only deliver heat to the working medium as long as they have a higher temperature than the temperature at which the working medium enters the heater, which temperature in turn is also higher in proportion as the temperature of the working medium leaving the turbine is higher. However, this does not represent a disadvantage in this case, since the combustion gases can still be utilised for preheating the combustion air after leaving the heater.

With a prescribed maximum temperature of the working medium entering the turbine, the outlet temperature of the working medium is determined by the expansion ratio, that is to say, by the value of the ratio of inlet pressure to outlet pressure of the turbine. The greater this ratio is, the lower is the outlet temperature. It is known that the thermal efficiency of such a thermal power installation, based on the heat supplied in the heater to the working medium, has a maximum value in dependence upon the expansion ratio, the thermal efficiency decreasing again after exceeding the corresponding expansion raito. In order not to deviate too much from the best value of the efficiency, the expansion ratio is therefore limited to a value which, for example, in an installation without intermediate heating of the working medium after partial expansion, is below 4 or at least does not substantially exceed 4. In an installation with intermediate heating, approximately the same limit applies for the individual expansion stages.

A thermal power installation of such design, which therefore has an expansion ratio which does not substantially exceed the value for best thermal efficiency, based on the heat supplied to the working medium, is referred to hereinafter as "standard design." Such installations have the maximum field of use, so that a development of separate types graduated according to power is proved to be expedient from the point of view of workshop manufacture.

The conditions are different when the heat to be utilised is available as perceptible heat in a heat carrier, for example in exhaust gases of an industrial process. The possibility then exists that the residual heat which remains in this heat carrier after giving off heat to the working medium of the thermal power installation can no longer be utilised. By an increase of the expansion ratio of the working cycle, however, it is known that it is possible to lower the temperature of the working medium leaving the turbine and thus also of the temperature of the preheated compressed working medium entering the heater. It is then possible for the heat carrier which gives off the heat to the working medium to be cooled to a lower degree in the heater. By this means, the residual heat of this heat carrier which cannot be used is reduced and a large part of the heat occuring in the heat carrier can be utilised. Despite a lowering of the thermal efficiency due to the raising of the expansion ratio beyond the best value, it is then possible to obtain an improved effective output, since in the heater a larger heat quantity is delivered to the circuit of the thermal power installation.

The invention has for its object to provide for these special cases a thermal power installation with an increased expansion ratio and thus improved utilization of the heat accumulating in a heat carrier, and to do so with smallest possible installation costs. For this purpose, the thermal power installation according to the invention comprises as a machine installation, one engine group of a standard design thermal power installation which provides an output and consists of at least one turbine and at least one compressor, and one engine group comprising a turbine and compressor which is additionally connected into the circuit on the low-pressure side for the purpose of increasing the over-all expansion ratio.

The advantage produced for a thermal power installation constructed in this manner is that it can mainly be assembled from normal engines also capable of being used for a thermal power installation serving other purposes. The supplementary engine group is specially designed but is comparatively inexpensive, since the turbine thereof is acted upon by the working medium which leaves the turbine of the normal engine group the temperature of this medium is already so low that it is not necessary to use expensive austenitic constructional materials. Furthermore, relatively high stressing of the materials is permissible.

Since both the normal engine group and also the supplementary engine group separately only deal with a part of the total expansion drop or produce only a part of the total compression ratio, it is possible so to construct the installation that with at least one of the two engine groups, that is to say, with the normal group or the supplementary group or with both groups, the turbine and compressor are arranged with a common shaft in a single housing. Such units have been used heretofore in other relations. The described installation is advantageous as regards space requirements, expenditure of material and also as regards friction losses in the bearings and leakage losses towards the outside, since the number of bearing points and the number of stuffing boxes sealing off in the outward direction are restricted to a minimum.

The engine group additonally included in the circuit is expediently of such design that it is independently balanced in output, so that the power supplied by the turbine is arranged just for driving the compressor. This engine group can then be operated to run freely without coupling to a receiver for the output. Such a design can be achieved by suitable dimensioning of the flow cross sections of the turbine blading of the engine group whereby the expansion drop which is additionally obtained and which is not required for driving the supplementary compressor is transmitted to the turbine of the normal group. This turbine therefore receives a somewhat larger drop than that for which it is normally designed, but which it can deal with without appreciable effect on the efficiency. The excess of power appears as supplementary output.

In order to avoid an excess of power of the engine group which is additionally introduced into the circuit, which excess may occur, especially with abnormal working conditions, and also to avoid an impermissible increase in speed of this group, which may possibily be produced as a result, it is expedient to provide a pipe-line which by-passes the turbine of this group or a pipe-line which by-passes the compressor of this group, or both, each such pipe-line being provided with an adjustable shut-off member. By opening such a shut-off member, the turbine output is then reduced or the compressor output is increased, so that a balanced output can again be produced.

Figure 2:
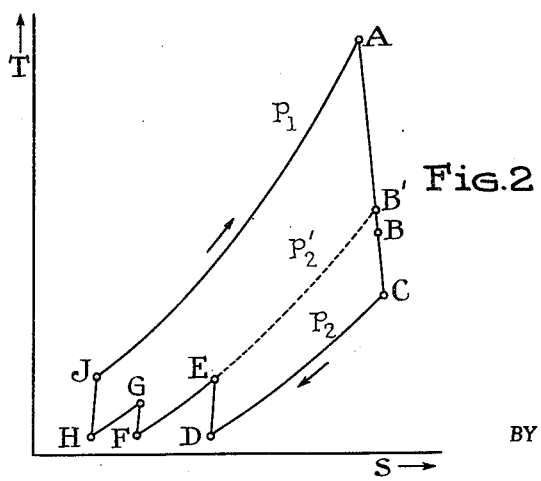

One embodiment of the invention and the effect produced thereby are illustrated by way of example in the accompanying drawing, wherein Figure 1 is a thermal power installation for utilising waste heat being accumulated in exhaust gases, and Figure 2 shows by way of example the course of the entropy diagram belonging to the operating circuit of an installation according to Figure 1.

The thermal power installation represented in Figure 1 consists essentially of a heater 1, a high pressure turbine 2, a low pressure turbine 3, a heat exchanger 4, a low pressure compressor 5 and a high pressure compressor 6. 7 represents a consumer of useful output, i. e. a generator of electric current which receives the power delivered by the thermal power installation.

A gaseous working medium describes a circuit in which it absorbs heat in tubes 8 of the heater 1 from a heat carrier entering by way of a pipe connection 9 and leaving by way of a pipe connection 10, is thereafter successively expanded in the turbines 2 and 3, without reheating flows through the heat exchanger 4, is successively compressed in the compressors 5 and 6 substantially to the starting pressure again, is preheated in the heat exchanger 4 by the working medium leaving the turbine 3 and thereafter flows back to the heater 1. The working medium flows through a cooler 11 before entering the compressor 5 and through a cooler 12 before entering the compressor 6. Furthermore, after partial compression in the compressor 6, it is intermediately cooled in a cooler 13.

The engine group consisting of the turbine 2 and the compressor 6 and delivering power to the current generator 7 is the machine installation of a thermal power installation which is referred to as being of "standard design" in the foregoing explanations. The engine group comprising the turbine 3 and the compressor 5 is additionally included in the circuit for the purpose of raising the expansion ratio.

The thermal power installation which is illustrated therefore comprises as a machine installation one machine group of a standard design thermal power installation consisting of a turbine 2 and a compressor 6 and supplying power, and one machine group consisting of a turbine 3 and compressor 5 which is additionally included in the circuit on the low-pressure side for the purpose of raising the expansion ratio.

Furthermore, in both engine groups 2, 6 and 3, 5, the turbine and compressor in each case are arranged with a common shaft in a single housing.

The engine group 3, 5 included in the circuit is so designed that it is independently balanced in output. The power delivered by the turbine 3 is fully consumed for driving the compressor 5.

For regulating purposes, the thermal power installation additionally comprises a pipe-line 15 which is provided with an adjustable shut-off member 14 and which by-passes the turbine 3 of the engine group additionally included in the circuit, and a pipe-line 17 which is provided with an adjustable shut-off member 16 and which by-passes the compressor 5 of the engine group additionally included in the circuit.

By opening the shut-off member 14, a part of the circulating working medium can pass without load in the turbine 3 from the inlet side to the outlet side of this turbine, and by opening the shut-off member 16, a part of the working medium compressed by the compressor 5 can pass back to the suction side of the latter. Both steps lead to an excess of the compression output beyond the output supplied by the turbine and operate in the sense of reducing the speed of the engine group 3, 5.

In the thermal power installation shown in Figure 1, the turbines are of axial construction and the compressors of radial construction. However, this is of no importance for the invention, in that the turbines can also be made of radial construction and the compressors also of axial construction.

Figure 2 illustrates by way of example in an entropy diagram the course of the working medium when passing through the circuit of the thermal power installation shown in Figure 1. The entropy S is plotted in the direction of the abscissae and the temperature T in the direction of the ordinates. The engine 2, 6 is designed for a course of the working medium which follows the line AB'EFGHJA, the working medium being expanded in the turbine 2 from A to B', that is to say, from a pressure $p_1$ to a pressure $p_2'$. The expansion ration $p_1:p_2'$ corresponds to that of an installation of standard design in accordance with the foregoing explanations. By connecting the engine group 3, 5 in the circuit on the low-pressure side, the lowest pressure in the circuit is now lowered from $p_2'$ to $p_2$. The course is now according to the line ABCDEFGHJA. The turbine 3 is so designed that it deals with the drop BC, which it requires in order to be able to drive the compressor 5 which compresses the working medium along the line DE. The drop BC is smaller than the expansion drop B'C which is additionally obtained, so that the drop of the turbine 2 is increased from AB' to AB. Since the compressor 6 retains substantially the same power admission as it had without the addition of the engine group 3, 5, the increase in the expansion drop of the turbine 2 is expressed in the delivery of an increased output to the current generator 7.

What is claimed is:

1. A thermal power installation in which a gaseous working medium describes a closed circuit, for utilizing waste heat delivered by a heat carrier, comprising a consumer of useful output; a compressor in which said working medium is brought from an initial pressure to a higher pressure which at the most exceeds slightly four times the initial pressure; a heater including means for heating the so-compressed working medium by waste heat given up by said heat carrier; a first turbine in which the compressed and heated working medium expands to a pressure below said initial pressure; an additional turbine in which the working medium leaving said first turbine expands additionally from the last named pressure to a still lower pressure; a flow connection by which the working medium leaving said first turbine is led to said additional turbine without significant changes of pressure or temperature; cooling means in which said working medium expanded to said still lower pressure is cooled; an additional compressor in which said additionally expanded and cooled working medium is recompressed to said initial pressure, said compressor being connected to be driven by said additional turbine and serving completely to absorb the output of said additional turbine and forming therewith a machine group which is mechanically indepent of said first turbine; flow connections whereby said compressor driven by said first turbine, said heater, said first and said additional turbine, said cooling means and said additional compressor in the order stated are traversed in series by the working medium; and a flow connection conveying the working medium leaving said additional compressor to the inlet of said compressor driven by said first turbine.

2. The thermal power installation defined in claim 1 in which the said cooling means include a heat exchanger traversed by the flow connection between the compressor and the heater whereby the working medium leaving the additional turbine is cooled by the compressed working medium leaving the compressor driven by the first turbine.

3. The combination of the thermal power installation defined in claim 1 and a pipe-line by passing the additional turbine, and provided with an adjustable shut-off member.

4. The combination of the thermal power installation defined in claim 1 and a pipe-line by-passing the additional compressor, and provided with an adjustable shut-off member.

5. A thermal power installation in which a gaseous working medium describes a closed circuit, for utilizing waste heat delivered by a heat carrier, comprising a consumer of useful output; a compressor in which said working medium is brought from an initial pressure to a higher pressure which at the most exceeds slightly four times the initial pressure; a heater including means for heating the so-compressed working medium by waste heat given up by said heat carried; a first turbine serving to cause the compressed and heated working medium to expand to a pressure substantially equal to said initial pressure; an additional turbine serving to cause the working medium leaving said first turbine to expand additionally from an intermediate pressure which is lower than said initial pressure to a still lower pressure, whereby the working medium in said first turbine is caused to expand to said intermediate pressure; a flow connection by which the working medium leaving said first turbine is led to said additional turbine without significant change of pressure or temperature; cooling means in which said working medium expanded to a pressure below said initial pressure is cooled; an additional compressor, in which said expanded and cooled working medium is recompressed to said initial pressure, connected to be driven by said additional turbine and serving completely to absorb the output of said additional turbine and forming therewith a machine group which is mechanically independent of said first turbine; flow connections whereby said compressor driven by said first turbine, said heater, said first and said additional turbine, said cooling means and said additional compressor in the order stated are traversed in series by the working medium; and a flow connection conveying the working medium leaving said additional compressor to the inlet of said compressor driven by said first turbine.

6. In a thermal power plant for recovering energy from waste heat, the combination of a main thermal comprising a consumer of useful output, a turbine and a compressor of the turbine type mechanically connected to operate as a unit, the turbine and the compressor being respectively characterized by an expansion ratio and a compression ratio each of which does not materially exceed 4; a mechanically independent low pressure thermal unit comprising a low pressure turbine and a low pressure compressor mechanically connected to operate as a unit and so proportioned that its compressor will substantially consume the output of its turbine when connected in circuit with said main thermal unit as hereinafter specified; a surface heater to which a flowing medium carrying waste heat serves to deliver heat; a heat exchanger having two flow paths; a cooler; and connections defining a flow path from the heater to the inlet of the turbine of the main thermal unit, from the outlet of said turbine to the inlet of the turbine of the low pressure thermal unit, from the outlet of the last named turbine through one path in the exchanger to and through said cooler to the inlet of the compressor of the low pressure thermal unit, from the outlet of the last named compresor to the inlet of the compressor of the main thermal unit and from the outlet of the last named compressor through the second path in the exchanger to the inlet of the heater.

7. The combination defined in claim 6 in which a valve-controlled by-pass is provided around one of the elements of the low pressure thermal unit to modify performance of the low pressure thermal unit.

References Cited in the file of this patent

UNITED STATES PATENTS

| | | |
|---|---|---|
| 2,432,177 | Sedille | Dec. 9, 1947 |
| 2,482,791 | Nettel | Sept. 27, 1949 |
| 2,625,789 | Starkey | Jan. 20, 1953 |
| 2,651,910 | Zakarian | Sept. 15, 1953 |

FOREIGN PATENTS

| | | |
|---|---|---|
| 411,787 | Great Britain | June 14, 1934 |
| 529,786 | Great Britain | Nov. 28, 1940 |
| 634,006 | Great Britain | Mar. 15, 1950 |